United States Patent
Skogsrud et al.

(10) Patent No.: US 10,037,088 B2
(45) Date of Patent: Jul. 31, 2018

(54) METHOD OF CREATING A CHORDING KEYBOARD MAPPING TABLE

(71) Applicants: Simen Svale Skogsrud, Oslo (NO); Even Eidsten Westvang, Oslo (NO); Øyvind Rostad, Oslo (NO); Kim Rubin, Menlo Park, CA (US)

(72) Inventors: Simen Svale Skogsrud, Oslo (NO); Even Eidsten Westvang, Oslo (NO); Øyvind Rostad, Oslo (NO); Kim Rubin, Menlo Park, CA (US)

(73) Assignee: Bengler AS, Oslo (NO)

( * ) Notice: Subject to any disclaimer, the term of this patent is extended or adjusted under 35 U.S.C. 154(b) by 32 days.

(21) Appl. No.: 15/311,162

(22) PCT Filed: May 19, 2014

(86) PCT No.: PCT/US2014/038648
§ 371 (c)(1),
(2) Date: Nov. 14, 2016

(87) PCT Pub. No.: WO2015/178889
PCT Pub. Date: Nov. 26, 2015

(65) Prior Publication Data
US 2017/0083108 A1    Mar. 23, 2017

(51) Int. Cl.
| | | |
|---|---|---|
| *G06F 3/023* | (2006.01) | |
| *G06F 3/01* | (2006.01) | |
| *A63F 13/814* | (2014.01) | |
| *A63F 13/20* | (2014.01) | |
| *G06F 3/048* | (2013.01) | |

(52) U.S. Cl.
CPC ............ *G06F 3/0235* (2013.01); *A63F 13/20* (2014.09); *A63F 13/814* (2014.09); *G06F 3/014* (2013.01); *G06F 3/048* (2013.01)

(58) Field of Classification Search
None
See application file for complete search history.

(56) References Cited

U.S. PATENT DOCUMENTS 6,763,320 B2 * 7/2004 Kimble .................. G06F 3/014
                                                        702/182

\* cited by examiner

*Primary Examiner* — Kenneth B Lee, Jr.
(74) *Attorney, Agent, or Firm* — Kim Rubin, Patent Agent

(57) ABSTRACT

A method of creating a chording keyboard mapping table is described. An exercise is created that is performed by users of a keyboard for which a mapping table is desired. The psychomotor performance of the users' transitions between chords is recorded—as distinct from performance relating to chords. A first trial keyboard mapping table (from chords to symbols) is created, and the effectiveness of that table is measured by applying it to a text corpus and measuring the total psychomotor cost to enter that corpus with that table. The table is then permuted, and the cost recomputed. Trial tables are repeatedly permuted, with one or more preferred tables being used as the basis for the next iteration of permutations. This continues until a terminating event, such as minimal improvement, is reached. Variations as embodiments are described. Software to implement the method is claimed.

15 Claims, 8 Drawing Sheets

| Pattern | Letter |
|---|---|
| ●○○○○ | (space) |
| ●●●●○ | e |
| ●●○○○ | t |
| ○●○○● | a |
| ●●○○● | o |
| ●○●●○ | i |
| ●○○●○ | n |
| ●○●○○ | s |
| ○●●●● | r |
| ●●●○○ | h |
| ●●○●○ | l |
| ○○●●○ | d |
| ●●●○● | c |
| ○○○○● | u |
| ●●○●● | m |
| ○●○○○ | f |
| ○○○●○ | p |
| ●○○○● | g |
| ●○●○● | w |
| ○○●○○ | y |
| ○●○●○ | b |
| ○●○●● | , |
| ○●●○○ | . |
| ○○●●● | v |
| ●●●●● | k |
| ○○○●● | x |
| ○○●○● | j |
| ○○○○○ | (null) |
| ●●●●○ | q |
| ●○○●● | z |
| ○●●●○ | (cmd1) |
| ○●●○● | (cmd2) |

Fig. 2

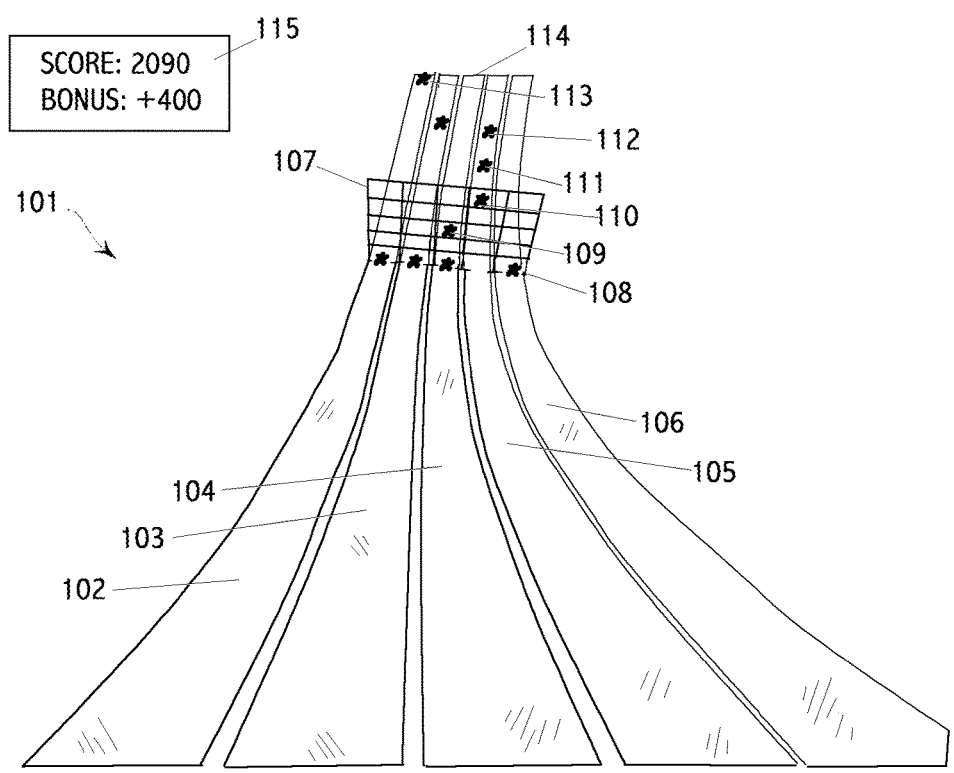

METHOD OF CREATING A CHORDING KEYBOARD MAPPING TABLE

TECHNICAL FIELD

The technical field of this invention is keyboards. More specifically, the technical field is chording keyboards. Even more specifically, the technical field is a method of creating a chording keyboard mapping table that maps keyboard chords to symbols.

A chording keyboard is one wherein a combination of keys, a "chord," may be depressed simultaneously to represent a symbol, and wherein such chords are part of the normal "typing" mode of the keyboard. Such keyboards are alternatively called chord keyboards, permuted keyboard or combinatorial keyboards.

BACKGROUND ART

Prior art patents include: U.S. Pat. Nos. 4,833,446; 5,184,315; 5,487,616; 5,642,108; 6,646,572; 7,259,751; and 8,542,195.

Researchers have previously attempted to optimize a chording keyboard table by measuring or using existing measurements of perceptual scores and motor scores of users typing chords on a chording keyboard for which the researchers wished to optimize. Another name for "score," in this context, is "cost," although favorability may be towards a higher score versus a lower cost.

One problem with this approach to optimization is that perceptual score and motor score for a user of a chording keyboard cannot effectively be separated. By attempting to measure these two scores independently, or by using independent research that did not use the precise keyboard to be optimized, effectively invalid information was used for the optimization. In some case, an arbitrary algorithm was employed, such as adding the two scores to produce a composite score, with no evidence that such a combination actually produced an optimal result.

Another weakness of the prior art was the use of a keyboard that required all keys on the keyboard to be released between chords. As compared to a preferred keyboard that permits each cord to transition directly to any next chord, the additional motor activity (more than twice as much motor activity) means that the results of those optimizations are unrelated to optimization of the preferred keyboard.

Yet another weakness of prior art methods is their use of measuring the cost of chords, as distinct from transitions. This is an extremely important difference, because a user's motor activity is entirely for creating the new chord, from the prior chord of the keyboard (which may be the chord of all keys released). That is, the motor activity is related to transitions, not chords. Thus, taking measurements tied to chords, not transitions, is fundamentally measuring the wrong thing with respect to identifying hand and finger motor costs; and thus does not properly optimize the chording keyboard map.

Yet another weakness of prior art is optimization in the placement of keys, typically as a distance from a resting state of a finger. This optimization may be appropriate for keyboard where a single finger must activate more than one key, but is an ineffective optimization where all fingers, or all fingers except the thumb, operate only a single key.

Yet another weakness of prior art is using pure timing as a method to disambiguate chords. Such a method presents two problems, both of which reduce the validity of the results. First, this method requires a minimum typing speed and competence with the keyboard, because otherwise the slow chord generation of beginners causes extraneous chords to be recognized. Second, it enforces a maximum typing speed because otherwise a briefly held chord will not be recognized and will be skipped. These two constraints on typing speed eliminate two important classes of users: users who are just beginning to use a chording keyboard—the same users who will be making a purchase decision; and users who have selected the keyboard to support very fast typing—the reason users select a chording keyboard at all. Additionally, these latter users are those likely to recommend such a keyboard due to its higher maximum typing speed than a QWERTY keyboard. Thus, the use of pure timing for disambiguation fails to optimize for these two extremely important groups of users.

Yet another weakness of prior art, in considering the cost of entering a chord, is the use of a one-dimensional cost table. That is, the table consists simply of S chords, with a numeric cost for each chord. If perceptual and motor scores are considered separately, then two such one-dimensional tables may be used.

Yet another weakness of prior art is measuring a frequency of letters or a frequency of letter pair in a corpus. This approach fails to take into account the many common letter sequences other than two letters. Consideration only of such static measurements fails to take into account the motor ease or difficulty associated with sequences as they actually occur in a text corpus. For example, in this prior art, common words such as "the," are considered as two unrelated pairs: "th" and "he." Similarly, portions of words such as "ing" or "tion" or not considered as groups.

The weaknesses of the prior art may be seen in the fact that not a single one of the research and development projects of the prior art has produced a widely adopted or commercially successful chording keyboard, or a one-handed keyboard, despite the obvious potential benefits of a one-handed keyboard, and the extensive amount of effort that has been devoted to trying to create an effective chording keyboard, over 35 years, from 1979 to the present.

DISCLOSURE OF THE INVENTION

Embodiments of this invention overcome the weaknesses and limitations of the prior art for creating an optimized chord table, also called a mapping table, for a chording keyboard.

A simplified scenario of one embodiment works as follows. An exercise for keyboard users, such as a video game, is created. The exercise presents to a user a challenge, using the keyboard, to enter a series of chord transition. Selected chord transitions are taken from a representative text corpus, although the exercise itself may not show any text from the corpus. The exercise measures the speed an accuracy at which the user is able to perform the chord transitions properly. Typically the user is presented with an award, such as points, for performing well, as a motivation to continue to use the exercise.

In some embodiments, the exercise or a variation using text, also serves as a teaching tool for users to learn how to use or type on the chording keyboard. As a user gains experience and her typing speed and accuracy improve, the exercise may automatically present harder challenges, such as longer sequences or requiring more speed.

The collection and aggregation of data is placed into a two-dimensional array of dimensions S by S−1 for S symbols. Each entry in the array represents the cost of the transition from the symbol on the first axis to the symbol on the second axis. Note that the psychomotor costs of transitions, not chords, is measured and aggregated.

Note that a text corpus does not contain some important chords, such as a cord for a null symbol, and chords for commands such as backspace, or new paragraph. These cords generally need to be placed in the chord table, but will not be in a typical text corpus. Thus, optimization for S symbols may occur on a keyboard with K keyboards states or possible chords, where K is greater than S. Note also that the S symbols used for an optimization may be less than, or considerably less than, the number of distinct or identifiable symbols in the text corpus.

Following the collection and aggregation of data from the exercises, a first trial chord map is created. The cost of that trial chord map is computed using the array and cycling through a portion of a real text corpus, or using statistical letter pair frequencies from that corpus.

A single score is the result of the above computation. That score is associated with the trial chord map. Then, the trial chord map is permuted, and the computation is repeated.

In one embodiment, the method of reducing the number of chord maps for testing is to select, at each iteration, the best M chord maps. On the next iteration, all M maps are tested, producing 2*M maps. Again, only the best M maps are kept. Other methods of converging on a preferred map are used in other embodiments. M may be 2, 3, 4, 5, 10, 20 or 100. M may be in the range of 2 to 10,000, or 2 to 500, or 2 to 50.

Based on a first condition, such as the rate of improvement of maps, the size of the permutation may be lowered for each iteration.

Based on a second condition, such as the rate of improvement of maps, the method completes, and the best map is selected. Alternatively, the final M maps may be manually inspected, and then one manually selected.

A first improvement over the prior art is the use of a keyboard that permits any chord to transition directly to any other chord, without requiring all keys to be released, or indeed any key to be released except as to create the next chord. In some embodiments other keyboards may be used.

A second improvement over the prior art is to measure only the combined "perceptual" and "motor" performance of the user as measured by the time to enter (or "type") a given set of transitions, and the accuracy of those entries. By not separating "perceptual" from "motor" ability, an accurate measure of real-word typing speed is used to create the chord map, and thus to optimize the keyboard. We refer to this merged and single measurement as a "psychomotor" cost.

A third improvement over prior art is to measure the psychomotor cost of transitions, not chords. As such, a two-dimensional, rather than one-dimensional array of performance is created for each user being measured, or aggregates of users. Each axis of the table has all of the chords whose transitions are being measured, with the intersection cell in the array the psychomotor cost of making the transition from the chord of one axis to the chord of the other axis. Both measuring transitions and the use of such a two-dimensional table are novel.

A fourth improvement over the prior art is the use of an actual text corpus for the exercise. This improvement captures the effect (psychomotor cost) of sequences longer than two symbols and captures the effect of common words and word portions, such as "the," "ing," and "tion."

A fourth improvement over the prior art is the step of permuting a proposed chord table and then re-computing the aggregate psychomotor cost of the revised chord table for an actual text corpus.

A fifth improvement is incorporation of commands or meta-text, as actually entered ("typed") by users, in some embodiments or methods. The distinction is that a finished text corpus does not include the realities of real typing, such as backspace, or new paragraph.

Since the number of permutations of a 28-entry chord table is a very large number, a method of selecting proposed permutations in a method to approach an optimal permutation is in an embodiment of this invention. This "permutation-computation-selection-iteration" cycle has not been used in the prior art in combination with selected embodiments of chording keyboards of this invention, or the use of a text corpus in the computation, or the use of a monolithic psychomotor cost of transitions.

BRIEF DESCRIPTION OF DRAWINGS

FIG. 2 is an exemplary chord table showing one possible mapping from chords to symbols.

FIG. 8 is a screen shot of an exemplary exercise, as a video game, for measuring psychomotor costs.

BEST MODE FOR CARRYING OUT THE INVENTION

Figure 1A:
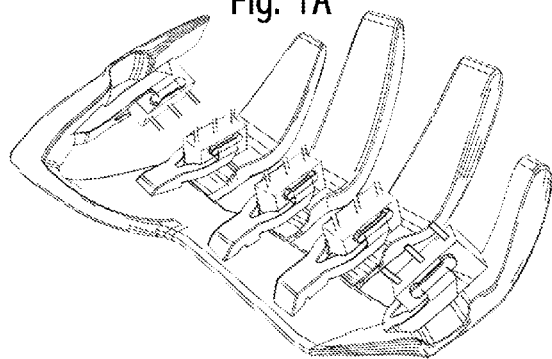
FIGS. 1A, 1B, 1C and 1D are drawings of multiple views of one embodiment of a chording keyboard.
Figure 1B:
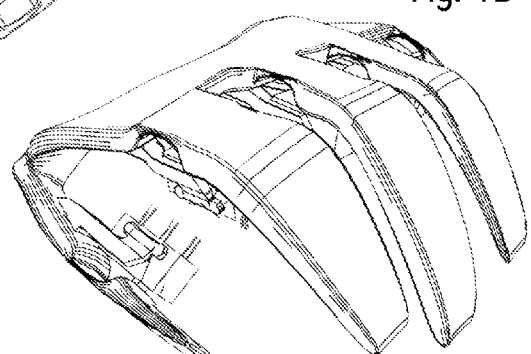
Figure 1C:
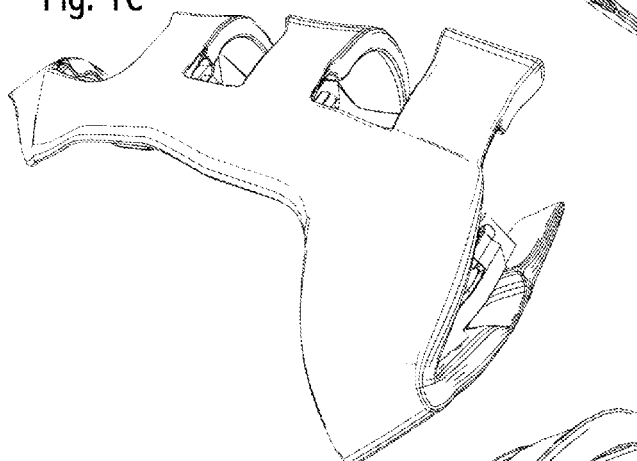
Figure 1D:
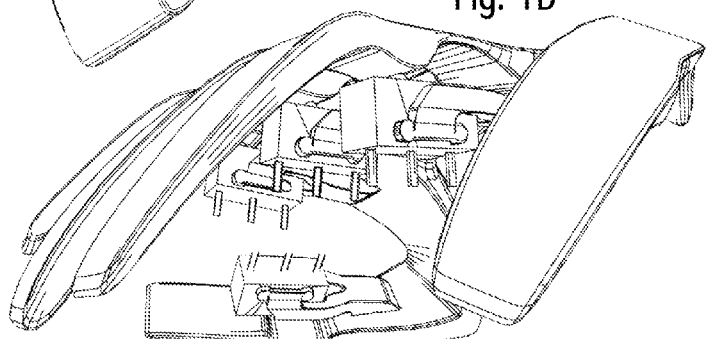

FIGS. 1A, 1B, 1C and 1D are drawings of multiple views of one embodiment of a chording keyboard. This keyboard has five keys, each key to be operated by one finger of one hand.

FIG. 2 shows an exemplary chord table. Here there are five keys: left to right: thumb, index, middle, ring, and pinky. A black circle indicates the corresponding key is depressed; a white circle indicates released. The first line in the table is for the space character. The second line is for the letter, "e," et cetera. All keys released is for "null"—that is, this chord does not generate a symbol. The Figure shows 30 chords for symbols, out of a possible 32 total chords. In one embodiment, two chords, as shown, are used for commands. The order of the chords shown in this table represent, for one embodiment, for one corpus, the frequency of the symbols in the corpus, with the more common symbols listed first.

For the methods of some embodiments discussed herein, the nature of the keyboard may be restricted to a keyboard with certain features, such a keyboard operated fully with one hand, or only a chording keyboard, or only a chording keyboard wherein any chord may transition directly to any other chord, or a chording keyboard where there is no requirement for a key to be released between chords, except when the second chord is defined with the key released, and the first chord is defined with the key pressed.

For some embodiment, the keyboard is free of a requirement that all keys be released between chords.

For some embodiments discussed herein, perceptual and motor scores are combined into a single score, a "psychomotor cost."

For some embodiments, the distance of a key on the keyboard from the fingertip of the actuating finger is not used in the method.

For some embodiments, the location of the keys on the keyboard is determined solely by the natural resting place of a user's (or a typical user's) fingertips.

For some embodiments, the keyboard uses only a single chord map.

For some embodiments, key transition timing used for disambiguation is fixed. That is, such timing as considerations for disambiguation does not depend, after the keyboard is built, purchased, or configured, on the performance of the user. Such a restriction provides consistent and predictable keyboard operation. In addition, such a restriction permits users to share keyboards without having the performance or operation of the keyboard change depending on the users.

For some embodiments, only the frequency of symbol pairs in a corpus is considered, with no consideration of the frequency of single symbols in the text corpus.

For some embodiment, no fixed key transition, key hold or key debounce times are used.

For some embodiments, a chord disambiguation step, algorithm or method is a required.

For some embodiments, all times for all key transitions for a word or word fragment are considered in the disambiguation of chords.

For some embodiments, Markov chains or their equivalent are used to accept chords, disambiguate chords, or both.

For some embodiments, a motor score of single chords is not used. For some embodiments, a perceptual score of single chords is not used.

Figure 3:
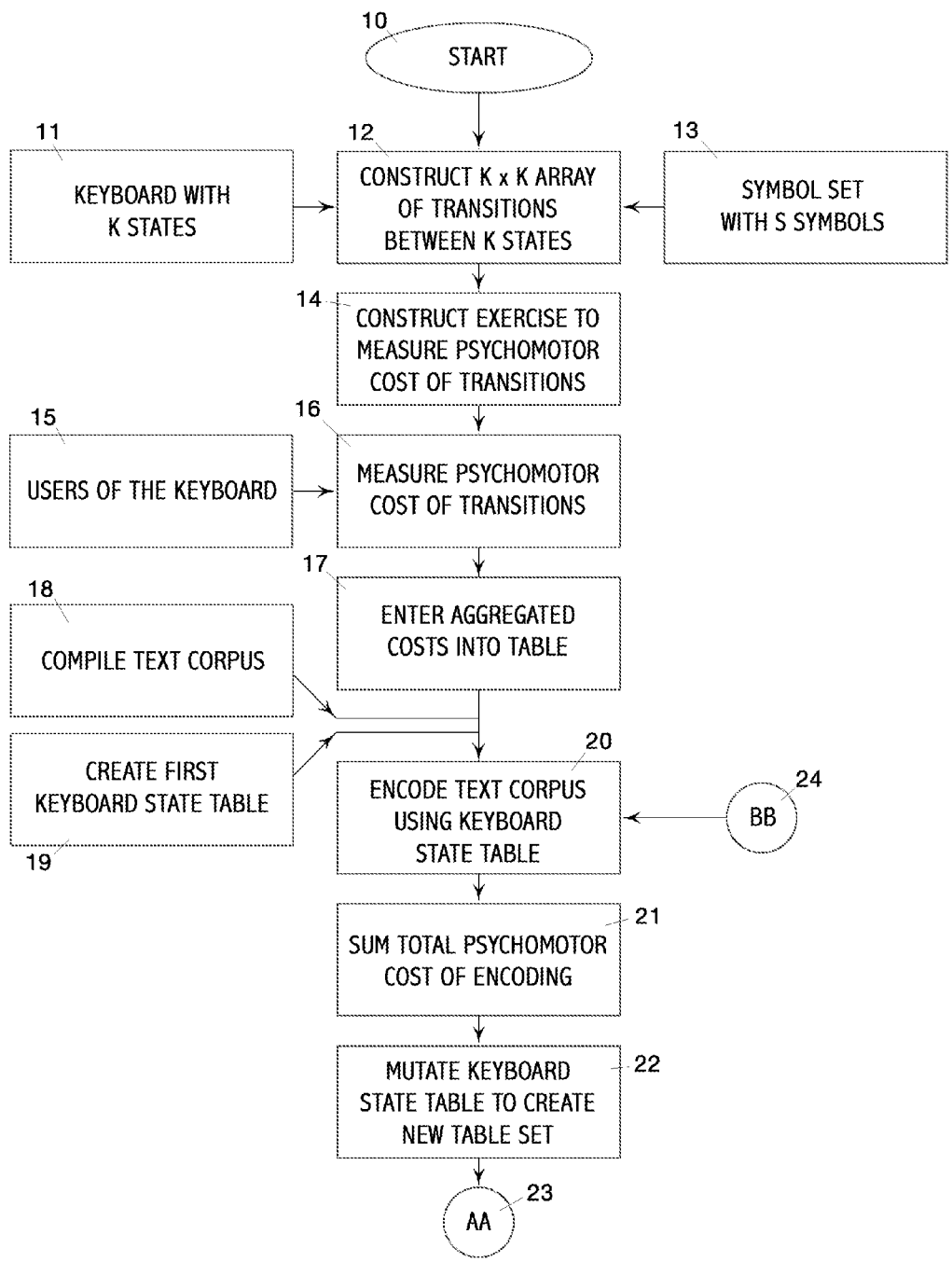
FIG. 3 is a portion of flowchart showing one embodiment of an algorithm that implements a method of this invention.

FIG. 3 shows a portion of a flowchart of one embodiment. The process starts at 10. A chording keyboard is defined with at least K keyboard states, or chords, 11. For example, a chording keyboard with five, two-state keys has 2^5 or 32 possible chords, so K=32 in one embodiment. An exemplary keyboard with four two-state keys and one three-state key has K=2^4×3=48. A chording keyboard of this invention may be portion of another keyboard. That is, a chording keyboard may be a sub-keyboard. For example, a chording keyboard may be designed to operate with both hands. A portion for the left hand and a portion for the right hand may each be considered a chording keyboard for the purposes of this invention. Similarly, a keyboard may have some keys that are not considered part of chording keyboard, for the purposes of this invention.

An array (also called a table) with K×K possible entries is constructed, 12, to record the psychomotor cost of each (or most, such as >50%, >75%, >90%, or 100%) chord transitions, where, for example, a transition is from a particular row chord to a particular column chord. This array may have only K×(K−1) entries, as transitions from a chord to the same chord may not exist or may not be placed into this table. The table may ultimately have blank entries for other reasons, such as a particular transition not corresponding to any text in an exercise or text corpus, or the keyboard being physically incapable of making such a transition, or a person not being able to make such a transition, or the transition is difficult to execute. For example, there may be two keys that are thumb operated, and a user is able to only operate one or the other key, but not both keys simultaneously. Or, one key may have to be released in order to operate a second key. A transition from a chord to itself may be implemented by a chord hold time greater than a threshold. Such a transition may be used to enter a double letter, or to enter a symbol not in the primary symbol set with S symbols.

Transitions may also be recorded, modeled, interpreted, stored, or any of these in combination, as Markov chains or their equivalent. Such Markov chains may be weighted, may permit multiple simultaneous paths as a method of disambiguation, and may produce a symbol, command, group of symbols, preliminary symbols, or a weight (for a chord or symbol, for example) for more than one possible final output of the Markov chain, as an "output" when the chain transitions from one state to another. The outputs of the Markov chain may be based on state transitions, the states themselves, or aggregated weights produced by flows through the Markov chain.

In step 13, a symbol set of with S symbols is defined or identified. This symbol set may be used for step 12, or, in alternative embodiments, it may not be required until steps 18, 19, or 20. That is, keyboard transition costs may be measured, in some exercises, without first having a known symbol set, 13.

In step 14, an exercise is created or selected to measure the psychomotor cost of transitions. There are many possible such exercises. One exercise is to simply ask users to enter text using the keyboard, then to measure the ease or difficulty of such text entry. For this exercise, step 13 must occur prior to step 14.

Psychomotor cost may be measured different ways. One way is to measure the amount of time required to execute the transition. Another way may include considering time required for entering transitions just before or after the transition being measured. Another way may include considering the statistical variation in time required. Yet another way may include measuring the rate at which users tire, entering this transition repeatedly. Yet another way may include the amount of time required for users to learn this transition, up to some predetermined level of skill. Yet another way may include consideration of the number of muscles required to implement the transition. Combinations of these measurement ways may be used. For convenience of discussion, we will generally refer to the time required to execute the transition as the psychomotor cost, with the understanding that other measures may be used.

An important aspect of the psychomotor cost is not only the total transition time from the prior chord, but also the amount of time that intermediate keyboard states existed prior to the final chord being realized. For example, a transition from all keys released to five keys depressed, may briefly transition through intermediate keyboard states where only less than five keys depressed. These intermediate keyboards states could potentially be misread as desired chords, and thus, ideally, the amount of time the user spends in these intermediate keyboards states should be minimal. Some chord transitions require a longer intermediate time than other chords. Thus, this intermediate time may be considered as part of the psychomotor cost.

Another appropriate exercise in step 14 is the use of a video game, where users must enter a specific cord, or specific cord combinations, to accomplish a game task. In one example, a roller coaster ride for a user is simulated. Chords or chord sequences combinations become visible to the user over the course of the ride. Entering the correct chord or sequence has positive game value, while not entering, or entering the wrong chord or sequence has a negative game value. Speed of entry may also affect game value. Game values may include points, sounds, prizes, visual rewards or penalties, virtual object collections, game levels or other game values or penalties. Game values may include payment in real money or other tangible consideration. Multi-player games, including MMOG, may be used, where players compete either cooperatively or competitively, or both. Existing games may be modified to include chording as part of the required game user interface.

Step 15 shows the users. It is generally important to know if the users are learning to use the keyboard, or experienced users. Other user attributes may be important, such as their age, hand size, gender, or native language skills.

In step 16, this embodiment measures the psychomotor cost of the chording keyboard transitions, using the exercise of step 14, by the users of step 15. Measuring costs is described above.

In step 17, the measured psychomotor costs are aggregated. In a simple embodiment, such costs are simply averaged over all users, or over a defined class of users, or over all times they executed the transition. It may be desirable to understand how different classes of users performed, and it may be desirable to know the statistical variation in psychomotor cost. In generally, it is desirable to have predictable keyboard performance, which includes low and intermediate keyboard state times.

One formula of psychomotor costs of a sample of times for a single transition is: $T-U+M*V$, where T is average transition time, U is a pre-determined constant, M is the standard deviation, and V is a pre-determined constant. V may be zero. U may be zero. Alternatively, T may be the amount of time (measured in hours of practice, or total number of this transition executed) needed for a user to reach a predetermined skill level of this transition. One reason to use T-U instead of simply T is that nearly all users have a minimum chording transition time that is fairly consistent, for example, the standard deviation of T may be 2, 1.5, 1, 0.7, 0.5 0.3 or in a range of these ratios, or in the range of 2 to 0.2 sigma of T. Selecting this minimum chording time, or a time slightly less than the average minimum chording time (such as 0.9, 0.8, 0.7, 0.5, or a range of these fractions, or in the range of 25% to 150%) as U generally provides a larger range for T-U than for T alone, and thus is a more sensitive measure of psychomotor cost.

The psychomotor cost of a transition may be the cost after a user becomes proficient, or it may include the cost learning to use the keyboard, or it may be primarily the cost of learning to use the keyboard.

Aggregation may comprise summing or averaging. Aggregations may be weighted. For example weighting might favor a class of users, or a class of symbols desired to be optimized.

In step 18 a text corpus is compiled or selected. One appropriate corpus to use is the text of Lewis Carroll's, *Alice in Wonderland*. Another suitable reference corpus is the text of all articles beginning on the front page of the New York Times. An exemplary date for such a corpus is the filing date of this patent application. http://corpus.byu.edu/ provides multiple English language and other language corpuses ranging in size from 34 million words to 1.9 billion words. Yet anther suitable reference corpus is the Brown University Standard Corpus of Present-Day American English.

The symbol set in step 13 is related to the corpus in step 18 because it is desirable to be able to encode the entire corpus using the selected keyboard (step 11). In some embodiment, step 18 may occur prior to step 13, or these two steps may interact iteratively. That is, the symbol set may be altered based on the corpus or the corpus may be altered based on the symbol set.

In step 19, a first trial keyboard state table is created. An example of a keyboard state table is shown in FIG. 2. A trial keyboard state table may be generated randomly, or a prior table may be used as a starting point. Certain chords may be "reserved," such as all keys released or all keys depressed. The most common symbols, such as the letter, "e" maybe pre-assigned to the simplest chords. A null symbol may be pre-assigned to the chord of all keys released. Commands may be pre-assigned, as commands often do not appear effectively in a chosen corpus.

In step 20 the selected text corpus from step 18 is encoded using the trial keyboard state table of step 19. Encoding refers to mapping the sequential symbols in the text corpus via the keyboard state table to chords, then using each pair of sequential chords as a transition, and then looking up the psychomotor cost of each transition in the psychomotor cost array. This encoding is done with a computer simulation. In essence, in one embodiment, as the corpus is scanned the psychomotor costs of each associated chord transition are accumulated. In the simplest case, no information, other than the accumulating psychomotor cost, need be kept during this encoding or simulation.

In another embodiment, rather than using a text corpus in step 20, real typing is used. Such typing may be in "real time," as this method, or a portion of this method may be performed while a user is typing; or may use a recorded stream of actual typing. Such a stream may be recorded by the above described exercise, or acquired by other means, such as adding software to a PC that records actual keystrokes and optionally timing of every key on the keyboard.

Note that some symbols in the text corpus may require more than one keyboard state transition to encode. For example, in one embodiment both numbers and symbols are "spelled out" with text letters. Thus, the number "10" in a text corpus may be encoded as "T-E-N." In some embodiments, fewer transitions may be required than characters in the text corpus. For example, a symbol set may be phonetic. As such an example, the French word, "Ébauche" may be encoded as the four phonetic symbols, "eboʃ," rather than as eight letters (including the accent mark). Punctuation and capitalization may require either more or fewer chords to encode than the number of characters in the corpus. Double letters may be substituted for single letters based on a dictionary or other means.

In step 21, we sum the total psychomotor cost of the encoding. Steps 20 and 21 may be performed simultaneously. Ideally, this sum is a single scalar number that is associated with the keyboard's encoded state table used in step 20.

Figure 6:
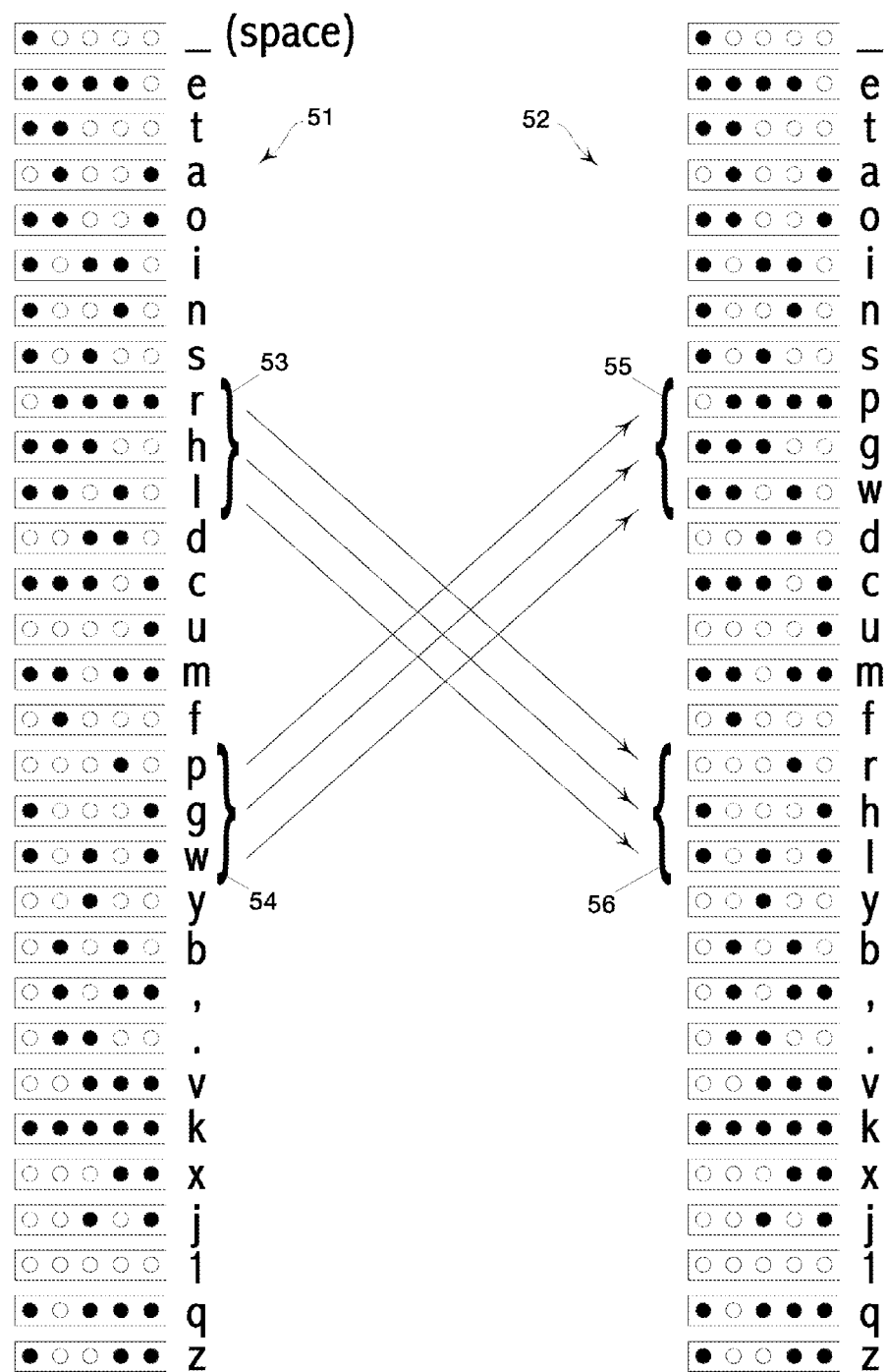
FIG. 6 is an exemplary mutation of a chord table.

In step 22 the embodiment mutates the keyboard state table used in step 20 into one or more new state tables. This set of tables may be identified as a table set. An example of a keyboard state table mutation is shown in FIG. 6. There are multiple ways to mutate the keyboard state table, or the chord table, in step 22. An alternative word to mutate is permute. In one embodiment the scope or size of the permutation may depend on the results of prior permutations. For example, if the benefit of recent permutations declines below a threshold, then the scope of the current or future permutations may be reduced.

Figure 4:
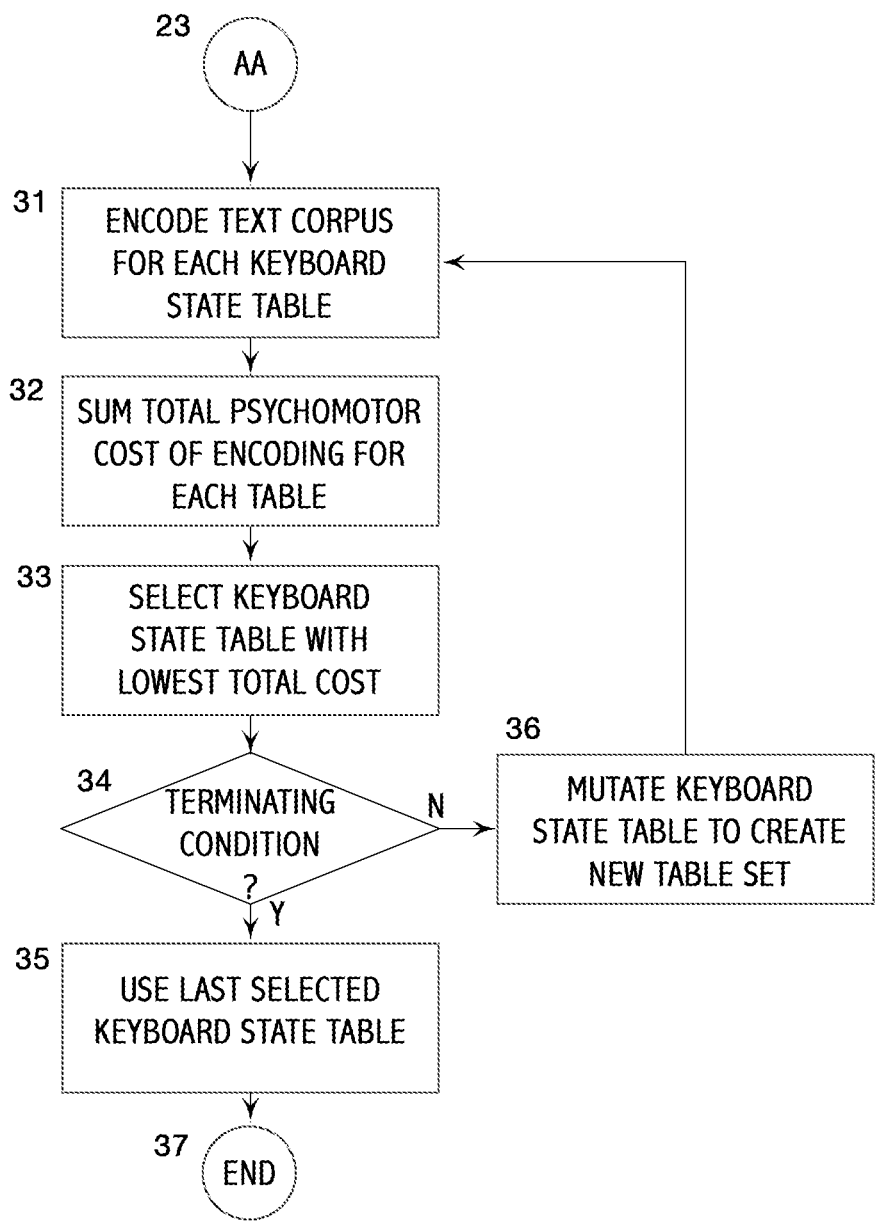
FIG. 4 is a continuation of the flowchart of FIG. 3

In addition, the entire method of FIGS. 3 and 4 may be run multiple times, with the best result of these multiple keyboard state tables selected, as a way to avoid the algorithm becoming stuck in a "local minima." The mutation or permutation in step 22 may have certain chords locked, such as a chord for a null symbol or chords for commands.

In step 23, AA, the flowchart continues in FIG. 4.

Step 24, BB, may be used as an entry point in the flowchart for multiple state tables. That is, steps 20 and beyond may be executed many times, possibly in parallel, for a set of keyboard state tables. Each such table will generate its own total psychomotor cost. If step 23, AA, goes directly to step 24, BB, with the next iteration occurring N times for N state tables in the new table set, parallel paths through the flowchart may grow exponentially, in a tree structure. In some embodiments, culling the total number of paths through the flowchart may be used. Typically, saving the lowest cost tables and discarding the highest cost table is a suitable method of culling. In one embodiment, keeping the best four tables is used.

We continue now at point AA, 23, in FIG. 4.

Step 31 is a repeat of step 20 from FIG. 3; only this step is performed on each new or permuted state table in the table set. Step 32 is a repeat of step 21 from FIG. 3, again performed on each new table.

In step 33 we select from the keyboard state table set the table with the lowest total psychomotor cost.

In step 34 we see if a terminating condition has been reached. One such terminating condition is the total number of iterations through this method chart. Another such terminating condition is the improvement in psychomotor cost for each new permutation is less than a predetermined threshold. For such a determination, the results of multiple iterations may be averaged. A suitable number of iterations is 100, 1000, 10000, 100000, or one million. A suitable threshold for limited improvement is that an average of the past 10 or 100 iterations has not improved at least 1% or 0.1%, or in the range of 0.01% to 10%, or in the range of 0.1% to 1%.

In step 36, if we have not reaching a terminating condition, the selected best state table is mutated, as in step 22 in FIG. 3, and the iterations are continued at step 31. A suitable number of mutations in the new table set is 2, 10, 100, 200, 500 or 1000, or any range of these numbers.

In step 35, if a terminating condition has been reached, the last selected keyboard state table is used. Such an exemplary state table is shown in FIG. 2. A keyboards state table is also called a chord table. The flowchart ends at 37.

It is often desirable to use a range of the strength of mutation, from one iteration to the next, or in creating a more diverse set of mutations in the next table set. At one extreme, all entries in a state table may be shuffled randomly. Less extreme mutations are randomly shuffling a smaller and smaller number of lines in the table until only two lines are swapped, the minimum mutation. As an alternative to shuffling, two groups of table lines may be swapped, but otherwise kept in order. Such a mutation is shown in FIG. 6.

One embodiment uses less extreme mutations through each iteration of the method. Another embodiment uses a range of mutation strengths at each iteration, creating in the new set of state tables some strongly mutated tables and some weakly mutated tables. A strong mutation may change 50% of the table entries. A weak mutation may change one table entry. An embodiment may change the mutation by reducing the number of table entries changed by a factor of two, for each set of iterations. An embodiment performs more mutations on high-frequency symbols than low-frequency symbols. An embodiment performs more mutation on fewer pressed key chords than on more pressed key chords.

Figure 5:
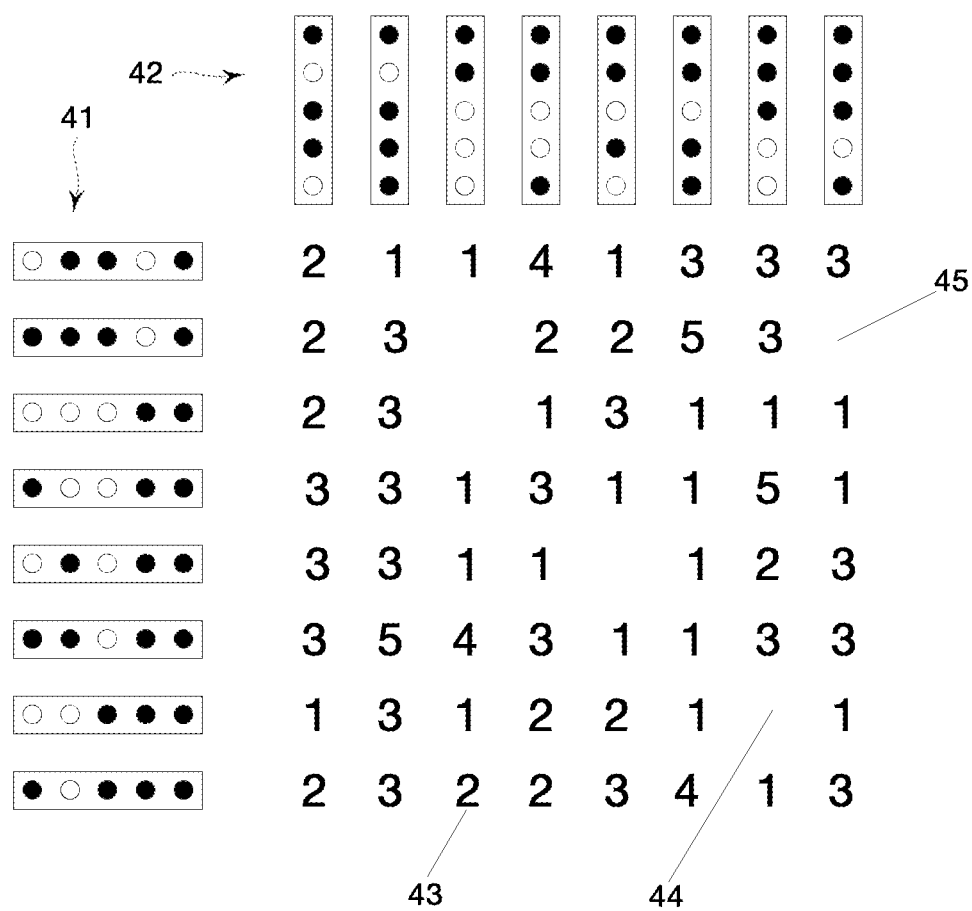
FIG. 5 is a portion of an exemplary psychomotor cost table.

FIG. 5 shows a fraction of one exemplary psychomotor cost chart. An exemplary chording keyboard with five, 2-state keys has $2^5$ or 32 keyboard states. The full psychomotor cost chart showing the psychomotor cost to transition from any chord to any chord would be a 32×32 array. In some embodiments the array has only 32×31 entries, as the cost to go from a given chord to the same chord may not be considered a transition, and thus not be an entry in the table. The table (or array) shown in FIG. 5 is an 8×8 portion of a full array. The left column, 41, shows the beginning chord of a transition. The upper row, 42, shows the ending chord of the transition. Each entry in the array, such as the number, "2", indicated by reference designator 43, is the psychomotor cost of the transition, on a scale of one to five, where, here, five is the highest cost and one is the lowest cost. A preferred embodiment records costs at a higher resolution than a five-point scale. Note that in this FIG. 5 the neutral chord, all keys released, corresponding in this embodiment to a null symbol, is not shown. A duplicate chord for double letters may be entered by using the neutral chord, or the chord for the null symbol, in between two otherwise consecutive instances of the same chord.

In the chart in FIG. 5, the upper-left to lower-right diagonal represents transitions from a chord to the same chord. In some embodiments this transition does not exit, as no chord change took place. However, in some embodiment the transition is represented by, in one case, a long hold time (such as longer than 300 ms, or longer than the range of 200 ms to 1000 ms). In another case, the transition is represented by a strong press by the user. Such a pressure increase may be at least two sigma or three sigma stronger than the average pressure used by that user for that chord, or similar chords, or all chords. Or it may be at least 50%, 100% or 200% more pressure. For touch-sensitive keyboards, the area of touch may be a proxy for pressure.

Such cord-to-same-chord transitions are typical for entering double letters, such as "ff" or "tt." In some embodiments this type of transition may be used for double digits, such as "00," or for some types of punctuation or control, such as a tab or new-paragraph being represented by a double space.

In one embodiment, the psychomotor cost chart is generated by a user entering text from a corpus. There may be transitions that never occur such as a two-letter pair that never occurs in the corpus text. In this case, no psychomotor data is available for that chord transition. Such a condition is shown blank entry 45 in FIG. 5. There is a second, non-diagonal blank entry in the Figure. Blank entries on the diagonal, such as 44, are due, in this example, to no corresponding double letter in the corpus.

FIG. 6 shows an exemplary mutation of a chord table. Here, two groups of three lines in the table are swapped. The starting table is shown on the left, 51. The mutated table is shown in the right, 52. The first group of three lines, 53, consists of the chords for r, h and l. This second group of three lines, 54, consists of the chords for p, g and w. In the mutation, the symbols for group 54 are moved to the position of 53, now 55 in the new table; and the symbols for group 53 are moved to the position of 54, now 56 is the new table. In these tables, the underscore character (_) is used to designate a space. Note that the table has only 30 lines, or rows. In the shown embodiment, two chords are reserved for special functions, or commands.

Figure 7:
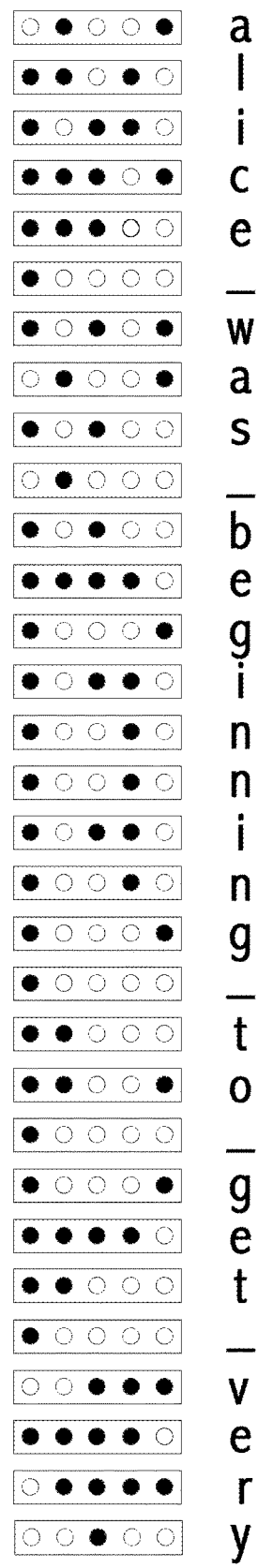
FIG. 7 is a sample of text encoded with chords.

FIG. 7 shows some text being encoded with the chord table of FIG. 2. This is the start of the book, *Alice in Wonderland*, by Lewis Carroll. The first six words are, "Alice was beginning to get very . . . " Note the chord transitions for the words, "beginning to." One will observe that the fingering changes are minimal, from one letter to the next, through these 13 characters. This is because the chord table used has been optimized, using an embodiment of this invention.

FIG. 8 shows a screen-shot from a video game that is one example of an exercise, as discussed above in step 14 of FIG. 3. Here a roller coaster is shown, 101. The user moves along and above the surface of the roller coaster, with increasing speed as the user's ability improves. Periodically, a gate, 107 and a set of chords, 108 thru 113 appear. The user's task is to enter ("type") all of the chords shown, in the order shown, correctly, before hitting the gate, in order to open the gate. Points are awarded or taken away based on the user's performance. In addition, as the chords are entered they are highlighted so the user can, in essence, "track" his or her chording sequence. Errors are shown in red, for example. Each of the tracks 102 thru 106 correspond to one key on the chording keyboard, and thus to one finger. The key for track 102 is operated by the thumb; the key for track 103 is operated by the index finger; the key for track 104 is operated by the middle finger; the key for track 105 is operated by the ring finger; and the key for track 106 is operated by the pinky finger; for right-handed operation. The gate is shown as 107. The first chord requested is 108. For this chord, all fingers except the ring finger should be depressed. The next chord is 109, then 110, 111, 112, and finally 113, for this group of chords. Chord 113 consists only of the thumb depressed.

The roller coaster continues to appear on-screen at location 114, as the game progresses. In this embodiment, the motion of the user (or, equivalently, the roller coaster) is continuous. In this screenshot, 114 is the top of the screen. Chord 113 has just appeared on the screen. In this embodiment, the five roller-coaster tracks (102 thru 106) have visible texture, and the track twists and turns through the course of the game.

A score and bonus points are kept, in one embodiment, as shown, 115. These numbers may or may not be related to the performance of the user as being measured for the purposes of this invention.

The sample chord group shown in FIG. 8, 108 thru 113, comprises six chords. Thus, there are five chord transitions. The user's performance for each transition is measured. What is measured, exactly, is discussed above. Transitions between chord groups are not measured. As a user gains skill, the chords presented are both more difficult and the groups contain more chords. Also, the time allotted decreases: effectively the speed of the roller coaster in the game increases.

As those trained in the art of video games know, there are many variations possible.

Such a game is also a teaching, training, practice, demonstration and skill improvement tool. Such a game may also be used to teach playing a musical instrument, such as piano, organ, accordion, guitar, violin, other stringed instruments, as well as woodwind and brass instruments that use fingering to select notes or chords. Audio may be used for both teaching and rewards. The user could be asked to "play along" with a song, whose notes are synchronized to the track and chords shown. Traditional note notation may be shown along side the roller coaster. For teaching, a source text or symbols may be presented to the student.

Use of Symbols in Text

Digits and symbols in text may be generated, in one embodiment, by using an alternate keyboard state table. One keyboard state may be used to "shift in" to the alternative keyboard state table. In a preferred embodiment, "shifting out" to the default letter-based keyboard state table is automatic, following a single character (such as a percent sign, or hash mark) or a complete number (by the use of a space, for example). In general, alternate state tables are not preferred embodiments.

Another way to generate digits and symbols is to spell them out. For example, a percent sign may be entered by using the characters P-E-R-C-E-N-T. A left or right parenthesis may be entered as P-A-R-E-N. The digit, 8, may be entered with the letters E-I-G-H-T. Software then applies rules of grammar and usage to determine if the text should be used as entered, or if digits and symbols should be substituted. One chord may be for a command key that indicates such substitution should be performed on text entered before or after that command.

An embodiment to generate punctuation uses only one or two punctuation characters. Software is then used to apply the correct punctuation character based on the rules of grammar. For example, the determination of whether a punctuation character should be a comma or a period may be determined by which parsing provides correct grammar, or the preferred grammar, or the most likely construct. Similarly, quotation marks, dashes, and apostrophes may be determined automatically. For example, the only correct interpretation of SISTER#S is that the hash mark (here the hash mark is representing "universal" punctuation keyboard state) is an apostrophe. Two universal punctuation marks may be used where the second mark indicates a possible, but less likely mark. Alternatively, the second universal mark may be used to indicate that the mark is part of a pair of matching marks, such as opening and closing quotation marks.

In another embodiment, symbols, special characters and commands may be entered as reserved two or three character sequences that are not words, nor the beginning part of any word. For example, the Q-Z chord sequence may be used to indicate an at-sign (@).

In another embodiment, words placed in quotation marks (or by the use of an alternative keyboard state signal) are used "as is," rather than looked up in the dictionary. The quotation marks may be automatically stripped off, according the rules of grammar. This permits any name of any spelling to be entered, for example, by simply quoting it. Keyboard state transition timing is still used, in this embodiment, to disambiguate keyboard entry and generate the most likely intent of the keyboard user.

Possible commands from the chording keyboard include:
Changing in or out of an alternative character set, such as another language, numbers, symbols, accent marks or accented letters, diacritical marks, portions of Unicode, abbreviations, names or contacts.
Indication of "no substitution" by dictionary words. Such command might be before or after the word or phrase of which is desired no substitution.
Backspace, backup, or delete.
Lookup, such as looking up from an abbreviation or misspelling: full name, address phone, email or other information.
New paragraph, new page, new document, begin or end a bullet or numbered list or table.
Save work.
Play back, such a read out loud a portion of text.
Send, such an email or text.
Connect to or execute entered information to another devices, such as dialing a phone, sending a text or twitter message, getting directions, moving data from an external device into the text stream, and the like.

Indication that the following or previous word entered is to be interpreted as a command, rather than text.

Add meta data to a document or text stream.

In one embodiment, punctuation, symbols, and any subset or all of the commands listed above may be entered by "spelling out" the desired result, such as spelling "comma" for a comma, or "nine" for the digit, "9," or "newp" for a new paragraph.

In one embodiment any combination of capitalization, punctuation, accented characters, spelling correction, and grammar correction or improvement are included in the output text stream, or added during the generation or the stream, or after part or all of a stream. For example, sentences may be properly punctuated after the sentence is complete, or after two sentences are complete (as the sentences may possibly be combined.) As another example, proper nouns may be recognized only after a full name is entered, or after a sentence is parsed (thus detecting, for example, if "school" should be capitalized or not). Such features include altering words wherein the proper selection or spelling of a word depends on context. Examples include "a" versus "an;" and "not only . . . but also."

Although such features as described above may have been used in the prior art, an unexpected benefit for application in this invention is the ability to use a much smaller and faster keyboard, and to have an effective one-handed keyboard.

Definitions

"Ambiguous Chords"—in the process of a user moving from a first intended chord to a second intended chord the keyboard may move briefly through one or more unintended chords. In such case, determining which chords are intended by the user and which chords are in fact unintended intermediate keyboards states makes the output of the keyboard ambiguous.

"Characters, Letters and Symbols"—The terms, "character", "letters" and "symbol," and their plurals, are generally different terms for the same thing, unless other meaning is clear. The term symbol is the most general. The term, "letters" is convenient to understand in the context of generating words. The term, "characters" may include both letters and punctuation. All three terms may include symbols used in computer programming languages, diacritical marks, punctuation and commands (such as a new paragraph or new page), and symbols for special purposes such as writing music.

"Disambiguation"—the process, method or steps to determine a likely intended chord, keyboards state transition, or series of chord transitions.

"Finger"—Unless otherwise clear from the context, a finger may include a thumb.

"Keyboard State Table" and "Chord Table" are two terms used interchangeably. A "keyboard state" and a "keyboard chord" are generally two terms used interchangeably, unless a distinction is made clear in the context. Note that multiple keyboard states may occur in a sequence to generate an accepted or output chord.

"Keyboard State"—Is any physically possible combination of key positions in a chording keyboard. A keyboard state explicitly includes the state where all keys are released.

"Press" and "Depress"—are two names for the same action or state.

"Symbol"—Symbols may include letters; digits; traditional text symbols such as an at-sign, percent sign, comma, etc.; text control information such as new-paragraph; symbols used in computer programming languages; phonemes and pronunciation symbols; text symbols used in languages that do not use the Roman alphabet; braille; music symbols; mathematical symbols; type-setting and printing symbols; editing symbols; acronyms; symbols to represent hand signals including sign language motions; industry specific symbols, terms and abbreviations; user-generated symbols, and one or more null-symbols.

"Table, Chart, and Map"—Use of the words, "table," "chart," and "map" may be terms generally interchangeably terms, unless a distinction is clear from the context.

"Word pool" and "word set"—These phrases are used interchangeably to describe the set of words under consideration as a word is generated, before a final word from the pool is selected and outputted.

"Word"—The term, "word," covers a wide range of symbol strings, including sub-words and other strings that are not in a traditional, constant written language dictionary. As examples: a dictionary may include names, abbreviations, acronyms, portions of a program in a programming language, text from historical usage of one or more users, and similar non-traditional sources of symbol strings.

Ideal, Ideally, Optimum and Preferred—Use of the words, "ideal," "ideally," "optimum," "optimal," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "option," "optional," "mode," "alternative," "typical," "ideal" and "feature," when used in the context of describing this invention, refer specifically to one or more embodiments of this invention. Described benefits refer only to those embodiments that provide that benefit. All descriptions, examples, and scenarios herein are non-limiting, as one trained in the art will appreciate.

All examples are sample embodiments. In particular, the phrase "invention" should be interpreted under all conditions to mean, "an embodiment of this invention." Examples, scenarios, drawings, applications, and claimed benefits herein are non-limiting. The only limitations of this invention are in the claims.

All combinations and sub-combinations of all features, embodiments, claims and claim limitations are explicitly included as embodiments herein. In particular, the limitations in all of the dependent claims are also claimed as dependent claims from all other independent claims.

We claim:

1. A method of creating a keyboard state table mapping a chording keyboard state k to a symbol s, for a chording keyboard comprising K keyboards states and a symbol set of S symbols, comprising the steps of:
   a) constructing an array of K*(K−1) entries wherein each entry represents a keyboard state transition of the chording keyboard from a first keyboard state k1 to a second keyboard state k2;
   b) constructing an exercise adapted to be performed by users of the chording keyboard wherein the users use the chording keyboard to generate a series of keyboard state transitions;
   c) measuring the difficulty with which a user generates each transition, such difficulty, as a single scalar, the, "psychomotor cost" of that transition;
   d) aggregating the psychomotor costs from different users of the exercise, for each transition in the array;
   e) entering the aggregated psychomotor cost for each transition in the array;

f) identifying a text corpus comprising sequential symbols from the symbol set;
g) creating a first keyboard state table that associates with each of the K keyboard states one symbol from the set of S symbols; assigning the first keyboard state table a keyboard state table under test;
h) encoding the text corpus using the keyboard state table under test;
i) summing the total psychomotor costs for all of the sequential transitions to complete step h, using the array to determine the psychomotor cost for each transition used in step h); this sum being the total psychomotor cost for the keyboard state table under test using the corpus;
k) creating a set of alternative keyboard state tables by permuting a different subset of table lines from the keyboard state table under test; wherein the size of the subset is Z table lines;
l) performing steps h) and i) for each table in the set of alternative keyboard state tables; wherein each table in the set of alternative keyboard state tables now becomes one keyboard state table under test; thus creating multiple keyboard state tables under test and copies of steps of this method;
m) selecting the one table from the set of alternative keyboard state tables that has the lowest total psychomotor cost; the selected table becoming a new keyboard state table under test;
n) repeating steps k) through m) until a terminating condition is reached;
o) using a last selected table as the keyboard state table created by this method;
wherein the chording keyboard is free of a requirement to release all keys between chords.

2. The method of claim 1 wherein:
when the keyboard generates any defined first chord consisting of a first depressed subset of less than n keys and the keyboard generates immediately following any second, different, defined cord in the set of 2^n cords comprising a second depressed subset of the n keys wherein the second subset comprises the first subset; and
the transition from the first chord to the second chord is free of a requirement than any key be released.

3. The method of claim 1 wherein:
the method is free of use of separate perceptual and motor scores associated with either chords or transitions.

4. The method of claim 1 wherein:
the method is free of use of perceptual, motor, or psychomotor costs associated solely with chords.

5. The method of claim 1 wherein:
the chording keyboard is adapted to be used fully by a single hand.

6. The method of claim 1 wherein:
for each symbol s in the symbol set S, the symbol is output from the chording keyboard by entering a single chord.

7. The method of claim 1 comprising the additional step of:
(p) expanding the final keyboard state table to comprise an additional state assigned to a null symbol s-n not contained in the set S.

8. The method of claim 1 wherein:
the method of claim 1 is free of perceptual, motor or psychomotor costs associated with individual chords.

9. The method of claim 1 wherein:
when the keyboard generates any first chord in the set of 2^n chords consisting of a first depressed subset of keys and the keyboard then generates immediately following any second chord in the set of 2^n chords comprising a second, different, depressed subset of the n keys,
the transition from the first chord to the second chord is free of any required key transitions other than those required to transition directly from the first depressed subset of n keys to the second depressed subset of n keys.

10. The method claim 1 with the additional step of:
r) reducing the size of Z with each iteration through the method.

11. The method claim 1 wherein:
in step k) the changing a subset of table lines comprises dividing the Z selected table lines into two groups, and then swapping the symbols in the first group with the symbols in the second group.

12. The method claim 1 wherein:
in step k) the changing a subset of table lines comprises randomly reassigning the symbols in the Z selected table lines.

13. The method claim 1 wherein:
the terminating condition comprises the change in aggregate psychomotor cost, from one iteration to the next, being less than a predetermined threshold.

14. A device to implement the method of claim 1 comprising:
a programmable computer comprising non-transitory memory adapted to perform the steps of the method.

15. Software to implement the method of claim 1 comprising:
steps to perform the method, wherein the software is adapted to be run on a programmable computer with non-transitory memory.

* * * * *